(12) United States Patent
Kroehl et al.

(10) Patent No.: US 12,394,422 B2
(45) Date of Patent: Aug. 19, 2025

(54) LABORATORY SYSTEM WITH PORTABLE MICROPHONE DEVICE

(71) Applicant: EVONIK OPERATIONS GMBH, Essen (DE)

(72) Inventors: Oliver Kroehl, Cologne (DE); Gaetano Blanda, Haltern am See (DE); Stefan Silber, Krefeld (DE); Ulf Schoeneberg, Berlin (DE); Inga Husen, Dortmund (DE); Michael Bardas, Weiterstadt (DE); Andreas Timm, Berlin (DE); Thomas Lange, Dortmund (DE); Sandra Bittorf, Witten (DE); Philipp Isken, Altenberge (DE)

(73) Assignee: Evonik Operations GmbH, Essen (DE)

( * ) Notice: Subject to any disclaimer, the term of this patent is extended or adjusted under 35 U.S.C. 154(b) by 490 days.

(21) Appl. No.: 17/439,965

(22) PCT Filed: Mar. 13, 2020

(86) PCT No.: PCT/EP2020/056962
§ 371 (c)(1),
(2) Date: Sep. 16, 2021

(87) PCT Pub. No.: WO2020/187789
PCT Pub. Date: Sep. 24, 2020

(65) Prior Publication Data
US 2022/0254353 A1    Aug. 11, 2022

(30) Foreign Application Priority Data

Mar. 18, 2019 (EP) ..................................... 19163512

(51) Int. Cl.
*G10L 17/22*   (2013.01)
*G01N 35/00*   (2006.01)
(Continued)

(52) U.S. Cl.
CPC ........ *G10L 17/22* (2013.01); *G01N 35/00722* (2013.01); *G06F 40/166* (2020.01); *G06F 40/40* (2020.01); *G10L 17/06* (2013.01)

(58) Field of Classification Search
CPC ........ G01N 35/00722; G01N 35/00584; G10L 17/00–26; G10L 15/00; G10L 15/06;
(Continued)

(56) References Cited

U.S. PATENT DOCUMENTS 6,594,630 B1 * 7/2003 Zlokarnik ............... G10L 15/26
                                                        704/E15.045
2013/0266952 A1   10/2013 Goemann-Tho et al.
(Continued)

FOREIGN PATENT DOCUMENTS

CN    108405012 A    8/2018
DE    102014005549 A1   10/2014
(Continued)

OTHER PUBLICATIONS

International Search Report PCT/ISA/210 and Written Opinion of the International Searching Authority PCT/ISA/237 for International Application No. PCT/EP2020/056962 Dated Jun. 2, 2020.
(Continued)

Primary Examiner — Thierry L Pham
(74) Attorney, Agent, or Firm — Harness, Dickey & Pierce, P.L.C.

(57) ABSTRACT

The invention relates to a laboratory system including at least one laboratory device which is designed to analyse and/or synthesise a chemical substance; at least one laboratory software module which is designed to process data obtained from the at least one laboratory device; a data processing device with control software that provides an interface for operating the at least one laboratory device and/or the at least one laboratory software module; and a
(Continued)

portable device with a microphone, wherein the device is connected interoperably to the control software via a network, wherein the device is designed, in interoperation with the control software, to allow a user to operate the at least one laboratory device and/or the at least one laboratory software module without manual intervention, by speaking into the microphone.

20 Claims, 4 Drawing Sheets

(51) Int. Cl.
    *G06F 40/166*     (2020.01)
    *G06F 40/40*     (2020.01)
    *G10L 17/06*     (2013.01)

(58) Field of Classification Search
    CPC ....... G10L 15/065; G10L 15/07; G10L 15/08; G10L 15/14; G10L 15/18; G10L 15/1815; G10L 15/1822; G10L 15/22; G10L 15/26; G10L 15/42; G06F 40/00; G06F 40/10; G06F 40/166; G06F 40/237; G06F 40/242; G06F 40/247; G06F 40/279; G06F 40/284; G06F 40/289; G06F 40/295; G06F 40/30; G06F 40/40; G06F 3/167; G06F 16/3329
    USPC .......................................................... 704/235
    See application file for complete search history.

(56) References Cited

U.S. PATENT DOCUMENTS

| | | |
|---|---|---|
| 2014/0206412 A1 | 7/2014 | DeJohn et al. |
| 2015/0074093 A1 | 3/2015 | Murthy |
| 2015/0105877 A1* | 4/2015 | Goemann-Thoss ..... H04L 67/10 700/83 |
| 2015/0127270 A1 | 5/2015 | Goemann-Thoss et al. |
| 2017/0161360 A1* | 6/2017 | Barsukova .......... G06F 16/3344 |
| 2018/0152446 A1* | 5/2018 | Gomar .................... G10L 17/22 |
| 2019/0018694 A1* | 1/2019 | Rhodes .................. G10L 15/26 |
| 2020/0027445 A1* | 1/2020 | Raghunathan .......... G10L 15/32 |
| 2022/0246148 A1* | 8/2022 | Christopher ............ G06F 3/167 |

FOREIGN PATENT DOCUMENTS

| | | |
|---|---|---|
| DE | 202018006083 U1 | 2/2019 |
| EP | 2857841 A1 | 4/2015 |
| JP | 2002229585 A | 8/2002 |
| JP | 2014-500132 A | 1/2014 |
| WO | 2017072351 A2 | 5/2017 |
| WO | WO-2019014507 A1 | 1/2019 |

OTHER PUBLICATIONS

Indian Office Action, dated Aug. 3, 2023, issued in Indian Patent Application No. 202117041655.
International Preliminary Report on Patentability and Written Opinion for PCT/EP2020/056962, dated Sep. 30, 2021.
Argentina Office Action dated Oct. 18, 2023 for corresponding Argentina Patent Application No. P200100685.
Japanese Office Action dated Dec. 26, 2023 for corresponding Japanese Patent Application No. 2021-556359.
B. Cestnik "Estimating probabilities : A crucial task in machine learning" In Proceedings of the Ninth European Conference on Artificial Intelligence, pp. 147-150, Stockholm, Sweden, 1990.
M. Hummel, D. Porcincula and E. Sapper "Natural Language Processing. A semantic framework for coatings science—robots reading formations" the European Coatings Journal (Jan. 2, 2019).

* cited by examiner

LABORATORY SYSTEM WITH PORTABLE MICROPHONE DEVICE

CROSS-REFERENCE TO RELATED APPLICATIONS

This application is a national phase under 35 U.S.C. § 371 of PCT International Application No. PCT/EP2020/056962 which has an International filing date of Mar. 13, 2020, which claims priority to European Patent Application No. 19163512.7, filed Mar. 18, 2019, the entire contents of each of which are hereby incorporated by reference.

TECHNICAL FIELD

The invention relates to the control of laboratory devices, and in particular to the control of complex laboratory systems.

PRIOR ART

In chemical laboratories, due to various hazards from both substances and devices, a variety of rules apply to ensure safe working there. Depending on the type of laboratory, the activities carried out there and the substances used, safety regulations can therefore include the following: the obligation to wear personal protective equipment, which, in addition to a lab coat, can also include protective goggles or a protective mask and protective gloves. As a rule, food and drink may not be brought in or consumed, and, to avoid contamination, the office area with desk, manuals, product documentation in paper form, computer workstation and Internet access and the laboratory work area are physically separated from each other. The physical separation may stipulate that it is only possible to change between the office area and the laboratory area via a security gate. It may also be mandatory to remove safety clothing when leaving the laboratory area.

The safety provisions complicate the workflow, sometimes considerably: laboratory devices, and especially complex laboratory systems comprising several laboratory devices, provide the user with their own user interface, which often consists of a screen, mouse and keyboard and/or a touch screen. These are often standard device components that are difficult or impossible to operate with laboratory gloves. There is an increased incidence of incorrect input, which slows down the workflow and may also lead to incorrect control and operation of the laboratory device. Taking off gloves before operating the laboratory system carries a risk of contamination, slows down work and is sometimes not possible at all for safety reasons.

In individual cases, there are laboratory devices having a particularly large keyboard, for example in the form of a large touch screen, to facilitate input with gloves. However, this special hardware is expensive and is not available for all laboratory devices. In particular, standard computers and standard notebooks do not have such a "glove-compatible" keyboard. However, the ability to operate also standard computers with a conventional Internet browser is becoming increasingly important in the laboratory context, for example, so as to be able to research chemical databases available online.

The currently available options for controlling or interacting with laboratory devices and laboratory systems are very limited and inefficient in the context of a chemical or biological laboratory.

SUMMARY

The objective of the present invention is to provide an improved laboratory system and method for controlling at least one laboratory device or laboratory software module according to the independent claims, which enables improved control of laboratory-related hardware and software functions, in particular in a laboratory context. Embodiments of the invention are described in the dependent claims. Embodiments of the present invention can be freely combined with each other if they are not mutually exclusive.

In one aspect, the invention relates to a laboratory system. The laboratory system includes at least one laboratory device which is designed to analyse and/or synthesise a chemical substance. The laboratory system further includes at least one laboratory software module designed to process data obtained from the at least one laboratory device. The laboratory system further includes a data processing device having control software that provides an interface for operating the at least one laboratory device and/or the at least one laboratory software module. The laboratory system further includes a portable device with a microphone. The device is interoperably connected to the control software via a network and is designed for interoperation with the control software to enable a user to operate the at least one laboratory device and/or the at least one laboratory software module without manual intervention, by speaking into the microphone.

Embodiments of the invention are advantageous because they enable facilitated and improved control and management of laboratory devices, e.g. in biological and chemical laboratories, by one or more persons. Since control of the laboratory devices and the associated laboratory software modules is via voice input, it is not necessary to remove gloves or to take other time-consuming measures to enter control commands. Voice-based input allows information to be entered anywhere within acoustic range of the portable device, particularly within a laboratory area. The person making the voice input therefore does not have to leave his or her laboratory workstation, or is able to move freely between different workstations in the laboratory area, as long as he or she does not leave the reception range of the microphone of the portable device.

The control of target systems by means of voice input is known in itself. The market offers inexpensive end devices with microphone and powerful applications for voice-based input of commands, for example Echo Dot with Alexa (Amazon), smart speakers from various manufacturers with Cortana (Microsoft), Google Home Max/Mini with Google Assistant (Google) and HomePod with Siri (Apple). However, these are designed to support end users in everyday activities such as shopping, choosing a radio programme or booking a hotel. Said end devices and applications are thus designed for everyday situations and also support only standard-language words. The existing end devices are neither designed nor suitable for use in a laboratory or for the recognition of technical words. Furthermore, the currently commercially available end devices are not designed to be subsequently modified by the user, and so a user has no possibility of using in a laboratory setting the SmartSpeaker systems with voice recognition currently available on the market. According to embodiments of the invention, a control software has been developed which is capable, alone or in interoperation with other components, of correctly converting also voice inputs containing technical-language words into text, and a portable device with microphone has been developed which is interoperable with this control software. In this way, a laboratory system has been provided that enables voice-based control of laboratory devices and associated laboratory software modules in a similarly simple way, without manual intervention, as is possible today in the smart home sector on the basis of Amazon's Echo Dot, for example.

According to embodiments, the control software is designed as a virtual laboratory assistant for the operation of the at least one laboratory device and the at least one laboratory software module.

This may be advantageous as it further facilitates the input of control commands by a user and the interaction between the user and the laboratory devices or laboratory software modules. For example, the virtual laboratory assistant can implement one or more voice generators, each of which generates a computer-generated but natural-sounding voice and reads the results of the performance of a particular function by a laboratory device or laboratory software module to the user in that natural voice. It is also possible for the virtual laboratory assistant to "listen" for a particular name, that is to say, to examine a voice input or a text generated from it to see if his or her name is mentioned in it and, if so, to perform certain functions itself or have them performed by a target system. The laboratory worker can thus interact with the control software and the virtual laboratory assistant implemented by it in a similar way as he would with a human colleague.

According to embodiments, the portable device is configured to receive a voice signal from the user via the microphone and to forward the received voice signal to the control software. The voice signal is forwarded to enable conversion of the voice signal into text by the control software or by a voice-to-text conversion system operatively connected to the control software.

According to embodiments of the invention, the portable device further comprises a speaker. The portable device is configured to receive, in response to the sending of the voice signal, a result of an execution of a function from the control software. According to the text, said function is performed by the at least one laboratory device and/or by the at least one laboratory software module. The portable device is further configured to output the received result to the user via the speaker.

For example, the received result can be a text that is converted into an audio signal via text-to-speech conversion software of the device. According to alternative embodiments, the control software includes a text-to-speech conversion function and the result is already sent to the portable device in the form of an electronic audio signal so that the end device, which in some embodiments can have only limited computing capabilities, no longer needs to perform text-to-speech conversion.

The output of the result as an acoustic signal via the speaker may be advantageous as it does not restrict the user's freedom of movement, this being achieved by the voice-based input of commands. The user can thus move freely from any point in the laboratory that is within the detection range of the microphone and the audibility of the acoustic output of the speaker, thereby both issuing control commands and research requests by voice input and receiving the results of the execution of these commands and/or information searches. This is particularly useful in the context of laboratory work, as laboratory personnel frequently have to switch between different devices and laboratory areas, for example, to reload or reconfigure machines, to check the progress of a process step, to release blocked components or transport boxes and the like.

According to some embodiments, the results of the software or hardware function performed by the laboratory software module or the laboratory device according to the voice input are displayed to the user via a screen. This can be done in addition to or instead of the output via the speaker. Especially in the case of complex and extensive results, e.g. the documents determined in the course of a database or Internet query, the output on a screen may be advantageous, since a user might not be able to absorb and understand all the information of a long text if it is only output via the speaker.

According to embodiments, the portable device is located within the same room as the at least one laboratory device and/or in the same room as a main control computer of a laboratory facility that includes the at least one laboratory device.

This may be advantageous because most types of microphone, and in particular the microphone of the portable device, are capable of recording voice input within a room and/or because the volume of most common speakers, and in particular that of the speaker of the portable device, is sufficient to be heard and understood by people in the same room.

According to some embodiments, the laboratory system comprises two or more of the portable devices described herein with microphone and with optional speaker. These devices are preferably positioned evenly distributed in the laboratory room. This may be advantageous as it allows for particularly good coverage both in terms of receiving voice inputs and outputting the results via speaker.

According to embodiments of the invention, the portable device is a single-board computer, in particular a Raspberry Pi computer.

This may be advantageous since such single-board computers are low-cost devices designed to be adapted and modified by the end user, e.g. by installing client software that is interoperable with freely definable server-side software, e.g. the control software, over a network to enable the user to use the functionality of the control software via voice input.

For example, the "Google Assistant SDK" allows Google's voice recognition services to be integrated into an end device such as a Raspberry Pi. Numerous video tutorials on this can be found on Youtube.

However, according to embodiments of the invention, the portable device is not directly connected to a Google service or other voice-to-text conversion service, and instead only client software is installed that makes the portable device interoperable with the control software that coordinates the exchange of data with a network-connected voice-to-text conversion system and the correction of text received from that conversion system.

For example, the software "Google Assistant on Raspberry Pi" can be installed on the Raspberry Pi and configured so that the voice signals received by the portable device are sent to the control software. The address of the control software is therefore predefined and stored in the portable device. This may be advantageous as it provides a portable and very inexpensive end device for the purpose of facilitating interaction with data-processing devices and services within a laboratory, which end device can be configured to interoperate with any software applications, e.g. control software implementing a virtual laboratory assistant.

Outsourcing this coordination function to the control software may be advantageous because Raspberry Pi computers only have low computing power and therefore the coordination of the conversion of voice signals into text as well as any subsequent text correction can be carried out more quickly by other, more powerful devices.

According to embodiments of the invention, the control software is configured to receive a voice signal picked up by the microphone based on the voice input from the portable device. The voice signal includes standard-language words and technical-language words spoken by the user. The control software is further configured to input the received voice signal into a voice-to-text conversion system, wherein the voice-to-text conversion system only supports conversion of voice signals into a target vocabulary that does not include the technical-language words.

The control software then receives, from the voice-to-text conversion system, a text generated by the voice-to-text conversion system on the basis of the voice signal. The control software is further configured to generate corrected text from the received text, the corrected text being generated by the control software alone or by the control software in interpretation with text correction software to which the control software is operatively connected locally or via a network. The corrected text is generated by automatically replacing words and phrases of the target vocabulary in the received text with technical-language words according to an assignment table of words in text form. The assignment table assigns at least one word from the target vocabulary to each of a plurality of technical-language words. The at least one word of the target vocabulary assigned to a technical-language word is a word or phrase that the voice-to-text conversion system falsely recognises when that technical-language word is input in the form of a voice signal. The control software is configured to use the corrected text to cause the at least one laboratory device and/or the at least one laboratory software module to perform the analysis, synthesis and/or software function as specified in the corrected text.

The use of a voice-to-text conversion system that does not support the technical words, in combination with a subsequent correction of the text based on the assignment table, can be beneficial for several reasons.

On the one hand, a number of general-language voice-to-text conversion systems already exist, e.g. Google's "Speech to Text", which have a high degree of accuracy at least for general-language words and phrases and can be used partly free of charge and can be integrated into proprietary software programs via an open API. A voice input in the laboratory context usually includes a mixture of technical words and general-language words, so that at least a correct conversion of the general-language words into text is guaranteed. The voice-to-text conversion systems of Google and other cloud service providers are continuously being developed, however this is a service that the manufacturers of laboratory devices and laboratory management systems usually cannot provide in the same quality as the large cloud service providers such as Google, Amazon, and Apple.

Said general-language voice-to-text conversion systems, however, are not in themselves suitable for use in the laboratory context, since technical-language words ("technical words") are not supported by the voice-to-text conversion system. In biology and especially in the chemical industry, a large number of technical words are used in the laboratory context that do not occur in the general language. These are not recognised by the voice-to-text conversion system, so similar-sounding general-language words are incorrectly recognised in their place and converted into text.

However, especially in the context of a chemical laboratory, high precision voice recognition is of particular importance. While in everyday language small errors are often recognisable as such and can be easily corrected or compensated for by the user or receiver system (for example, incorrect recognition of the singular/plural form does not cause a corresponding entry in an Internet search engine to return significantly different results), in the context of chemical syntheses even the smallest deviations (e.g. "bis" instead of "tris") can lead to a completely different substance being "recognised" than the one the speaker actually meant, and can lead to the resulting product being unusable. The said voice-to-text conversion systems designed for everyday use are therefore not suitable for use in biological and chemical laboratories.

Some of the existing voice-to-text conversion systems are specially designed for the needs and vocabulary of a particular specialist sector. For example, the company Nuance offers the software "Dragon Legal" for lawyers, which includes legal terminology in addition to everyday-language vocabulary. The disadvantage, however, is that the vocabulary required in a specific laboratory, e.g. in the field of production and analysis of paints and varnishes, is so specific and dynamically changing that even voice recognition software with chemical terms, which could be taken from a standard chemistry textbook, for example, would often be unsuitable for the practice of a specific company or a specific branch of the chemical industry, since in many cases the laboratory also works with trade names of substances. These trade names can change or a large number of new trade names for relevant products are added every year. In particular, every year a large number of additional products and product variations appear on the market under new trade names that can be used for the production of paints and varnishes. Even if there were a language-to-text conversion system that came close to the accuracy of the everyday-language systems of Google or Apple and that included the most important chemical terms (which is not the case), this system would not be very suitable for use in practice due to the dynamics and multitude of names that play a role in the chemical laboratory, especially in the production of paints and varnishes, as most of the words relevant in practice would not be supported or, at least after a few years, the vocabulary would be completely outdated.

According to embodiments of the invention, this problem is solved as described above by using a voice-to-text conversion system that is known not to support the relevant technical terms. Thus, from the outset, no attempt is made to implement an expensive and complex special development here, which would only serve a very small market segment and would therefore in all likelihood not achieve the recognition accuracy of the known large conversion systems from Amazon, Google, Microsoft Azure or Apple, as far as general-language terms are concerned, which must also be taken into account and correctly recognised in voice inputs in addition to the technical chemical terms. Instead, embodiments of the invention make use of the already very good recognition accuracy of existing service providers for general language terms and carry out a correction before outputting the recognised text. In the course of the correction, the incorrectly recognised words are replaced by technical words on the basis of the assignment table, so that a corrected text is produced which is finally output. The highly specific technical vocabulary, which must be continuously updated due to the dynamics of the sector and the large number of market participants, products and corresponding product names in order to keep the software suitable for practical use, is ultimately contained in an assignment table. This can be kept up to date with very little effort. A modification of program source code, of statistical language models, a recompilation and/or retraining of machine learning programs is therefore not necessary according to embodiments of the invention; a modification or addition to a table is sufficient.

New technical words can be added simply by adding the new technical words to the assignment table, in each case together with one or more target vocabulary words incorrectly recognised for that technical word. From a technical point of view, the storage and updating of the technical words is thus completely decoupled from the actual voice recognition logic. This also has the advantage of avoiding dependence on a particular provider of voice recognition services. The field of voice recognition is still young and it is not yet foreseeable which of the multitude of parallel solutions will be the best choice in the long term in terms of recognition accuracy and/or price. According to embodiments of the invention, the tie to a particular voice-to-text conversion system is only established by first sending the received voice signal to this conversion system and receiving a (incorrect) text. In addition, the assignment table contains incorrectly recognised words of the target vocabulary which were (incorrectly) returned by this particular conversion system for a particular technical term. However, both of these can be easily changed by using a different voice-to-text conversion system to generate the (incorrect) text and, for this purpose, also recreating the assignment table using this other conversion system. Complex changes, for example to the logic of a syntax parser and/or a neural network, are not necessary.

The combination of the everyday-language voice-to-text conversion system according to embodiments of the invention may also be advantageous for sales representatives in the chemical industry or in chemical production, since these individuals often use a computer or at least a smartphone in the course of their work anyway and are less distracted from the customer or their work by a voice input into a correction software designed, for example, as an app or as a browser plug-in than by a text input via the keyboard. These users can also be given access to and control over the functions of the laboratory device and/or the laboratory software module of the laboratory system via client software on their end devices, which client software is interoperable with the control software in order to pass on voice signals from these users to the voice-to-text conversion system via the control software.

Another advantage can be that the portable device according to embodiments only receives the voice signal, passes it to the control software, and optionally receives and outputs a result of the execution of a function according to specifications of the voice input. The actual voice-to-text conversion of the voice signal to text, that is to say by far the most computationally intensive step, is performed by the voice-to-text conversion system. The voice-to-text conversion system can be, for example, a server that is connected to the control software via a network, for example the Internet. Thus, a portable device with low processing power, for example a smartphone or a single-board computer, can also be used for the input of long and complex voice inputs and the resources of the computer on which the control software is installed are also conserved.

According to embodiments of the invention, the technical-language words are words from one of the following categories:

names of chemical substances, in particular paints and varnishes in particular also refer to chemical names according to a chemical naming convention, e.g. according to the IUPAC nomenclature;

physical, chemical, mechanical, optical or haptic properties of chemical substances;

Names of laboratory devices and devices from the chemical industry (e.g. trade names or proper names assigned by the user for the laboratory devices of a laboratory));

names of laboratory consumables and supplies;

trade names in the paint and varnish sector.

According to embodiments of the invention, the technical-language words are words from the field of chemistry, in particular the chemical industry, in particular the chemistry of paints and varnishes.

According to embodiments of the invention, the target vocabulary consists of a set of general-language words.

According to other embodiments of the invention, the target vocabulary consists of a set of general-language words as well as words derived therefrom. These derived words can be, for example, dynamically created concatenations of two or more general-language words. In the German language, for example, many words, especially nouns, are formed by combining several other nouns. For example, the German word "Schiffsschraube" (ship's propeller) is so common that it is usually present in most German general-language dictionaries. In contrast, a rather rarely used German term such as "Besfestigungsschraube" (fastening screw) is absent from most German general-language dictionaries. However, some voice-to-text conversion systems can also recognise words like "fastening screw" by means of heuristics and/or neural networks, provided that the individual word components "fastening" and "screw" are part of the target vocabulary. In this sense, the word "fastening screw" then also belongs to the target vocabulary of this type of voice-to-text conversion system.

According to other embodiments of the invention, the target vocabulary consists of a set of general-language words supplemented by words formed by combining recognised syllables. These voice-to-text conversion systems are thus more flexible in terms of which words can be recognised, since recognition can—at least also—take place at the level of individual syllables, not just individual words. However, syllable-based recognition is also particularly prone to error, as the risk of incorrectly recognising a word that does not exist in any known vocabulary is particularly high. Due to the finite nature of the set of supported or known syllables and the limitation of the set of combinable syllables by the typical word length, the set of syllable-based target words that can be generated is also finite. Thus, even voice-to-text conversion systems that support syllable-based word generation have a finite target vocabulary despite their greater flexibility. Even if such systems, due to their flexibility, are theoretically able to dynamically recognise many chemical terms that are not contained in a pre-known lexicon, the recognition accuracy in practice is so low that, with regard to practical use, even systems such as these ultimately have a target vocabulary that does not contain or support these chemical terms.

In some embodiments of the invention, the target vocabulary comprises a set of general-language words supplemented by words derived therefrom and supplemented by words formed by combining recognised syllables. These conversion systems are also based on a target vocabulary that does not contain the technical words or cannot recognise them with sufficient accuracy in practical use, but instead incorrectly recognises other words, typically general-language words, and converts them into text.

Thus, a variety of different voice-to-text conversion systems already available today can be used for embodiments of the invention, even if these systems "support" substantially only everyday-language words (i.e. can correctly recognise and convert them into text with sufficient accuracy).

According to embodiments of the invention, the computer system performing the text correction, e.g. the computer with the control software or the correction computer, receives or calculates frequency information for at least some of the words in the text generated by the voice-to-text conversion system from the voice signal. The frequency information indicates for each word in this text how often the occurrence of this word is to be expected statistically.

When generating the corrected text, only those words of the target vocabulary in the received text whose statistically expected frequency of occurrence according to the received frequency information is below a predefined threshold are selectively replaced by technical-language words in accordance with the assignment table.

This may be advantageous because voice input from the user usually contains a mixture of general-language words and technical words. Thus, it may also be the case that the text received by the conversion system contains words of the target vocabulary that are assigned to a technical word in the assignment table and would normally be substituted. For example, the returned text might contain the phrase "polymer innovation". Since this term "polymer innovation" is assigned to a technical word "polymerisation" in the assignment table, the term would normally be replaced by "polymerisation" in the course of the text correction. However, if the term "polymer innovation" is assigned a frequency that represents a high probability of occurrence, the correction software assumes, based on this frequency of occurrence, that the term "polymer innovation" is correct, even though it is assigned to a technical word in the assignment table, and as a result leaves the term "polymer innovation" unchanged in the text. For example, a contextual analysis of the words within the sentence or within the overall voice input may reveal that the word "innovation" occurs frequently alone in the text, e.g. because the text comes from a sales representative describing the benefits of a particular polymer product. In this context, the term "polymer innovation" may also be a correctly recognised phrase. In a context where neither "polymer" nor "innovation" are mentioned alone, the probability decreases. Words also have different probabilities of occurrence independent of context, which can be derived from large text corpuses, for example.

Replacing words according to the assignment table depending on the probabilities of occurrence of the words in the received text may be advantageous, since it prevents, in a few individual cases, a situation in which words of the target language, which in themselves or in the context of the text in question have a high probability of occurrence, are mistakenly replaced by a technical word and an error is created instead of corrected by the replacement.

According to one embodiment, the frequencies of occurrence of the words of the text are calculated by the voice-to-text conversion system and are returned together with the text from the voice-to-text conversion system to the control software. For example, the voice-to-text conversion system may use Hidden Markov Models (HMMs) to calculate the probability of occurrence of a particular word in the context of a sentence. Additionally or alternatively, the voice-to-text conversion system can equate the frequency of occurrence of a word with the frequency of occurrence of the word in a large reference corpus. For example, the entirety of a newspaper's texts over several years or some other large data set of texts can serve as a reference corpus. The ratio of the counted number of words in the corpus to the total number of words in the corpus is the observed frequency of occurrence of this word in this reference corpus. The frequency data can be sent from the voice-to-text conversion system to the control software along with the text.

According to a further embodiment, the frequencies of occurrence of the words of the text are calculated by the control software or the correction software after receipt of the text. As already previously described, the calculation of the probabilities of occurrence of the individual words or phrases can be performed by means of HMMs, taking into account the text context of a word or using the frequencies of the word in a reference corpus. The reference corpus can be, for example, the entirety of the texts previously transmitted by the voice-to-text conversion system to the control software or correction software.

Thus, according to embodiments, the calculation of the frequency data (e.g. by the control software or the correction software) is performed using a hidden Markov model. For example, the expected frequency of occurrence, i.e. the probability of occurrence, can be calculated as the product of the emission probabilities of the individual words of a word sequence, for example as in B. Cestnik "Estimating probabilities: A crucial task in machine learning" In Proceedings of the Ninth European Conference on Artificial Intelligence, pages 147-150, Stockholm, Sweden, 1990.

According to embodiments of the invention, in addition to the text, the program performing the text correction also receives part-of-speech tags (POS tags)—for at least some of the words in the text generated from the voice signal by the voice-to-text conversion system. The POS tags are received by the voice-to-text conversion system from the control software directly or from the correction software via the control software and include at least noun, adjective and verb tags. It is also possible that the POS tags include additional types of syntactic or semantic tags. The exact composition of the POS tags considered can also depend on the language. In the assignment table, the technical-language words are stored linked together with their POS tags. When generating the corrected text, only those words of the target vocabulary in the received text whose POS tags match are replaced by technical-language words according to the assignment table.

This may be advantageous as it increases the accuracy of the text correction step. The correctness of the POS tags in the assignment table can be assumed because the entries in the table are created semi-automatically by one or more speakers inputting a technical-language word or phrase into a microphone, the resulting audio signal being converted by the voice-to-text conversion system into an (incorrect) word or (incorrect) phrase of the target vocabulary, and this incorrect word or this incorrect phrase being stored in the assignment table linked to the technical-language phrase. Since it is known what the technical-language term stands for and whether it is, for example, a noun, verb or adjective, the technical-language term may also be stored linked to the correct POS tag at the same time as the table is created or updated. So if, according to the assignment table, a certain word and phrase in the text needs to be replaced by a technical-language word, but the POS tags of the text to be replaced do not match the POS tag of the technical-language words, this is an indication that the corresponding words in the text might be correct after all. The recognition rate of the POS tags is comparatively high, so this measure can increase the quality of the correction step. For example, a technical-language word can be the trade name "Platilon®". It designates thermoplastic polyurethane films from the company Covestro. In the table, a POS tag "noun" is assigned to this technical word. It is known from the voice-to-text conversion system that it often incorrectly converts the spoken word "Platilon" into the target vocabulary word "platinum"; therefore the word "platinum" of the target vocabulary is assigned to the technical word "Platilon" in the assignment table. However, in a recent voice input by a user, the word was used adjectivally: "addition of a platinum- or zinc-based catalyst [ . . . ]". Based on the POS tag of "platinum" in the text returned by the conversion system, it may be possible to recognise that the word "platinum" is correct here and should not be replaced by "Platilon".

According to embodiments, the control software is provided as a cloud service from a cloud computer system or a single server computer system. This cloud computer system or server system may, for example, be a system operated by the operator of the laboratory, e.g. a university or a company.

According to one embodiment, the control software performs the text correction itself or in interoperation with a programme installed locally on the same computer as the control software.

According to another embodiment, the correction of the text received from the voice-to-text conversion system is performed by another computer connected via a network to the computer of the control software. The other computer may be, for example, a cloud system or a single server, which is also operated, for example, by the operator of the laboratory. The control software sends the received text to the software and computer by which the correction is performed on the basis of the allocation table and receives the corrected text from this software or computer ("correction software" or "correction computer"). The network connecting the control software to the remote correction software may be, for example, the Internet or the Intranet of an organisation. This embodiment may be advantageous because a better separation of access rights to the functions and data of the control software on the one hand and the correction software on the other hand is possible. If the text correction is carried out on a separate correction computer or correction cloud system, a user can be granted selective access to the correction computer or correction cloud system for the purpose of updating the table without having to grant access to sensitive data of the control software, which can, for example, control sensitive functions of laboratory devices.

Thus, according to embodiments of the invention, coordination of the data exchange with the voice-to-text conversion system, the text correction and the transmission of the corrected text to the execution system is entirely performed or organised and coordinated by the control software. Thus, according to some embodiments of the method, the portable device is basically a device with a microphone and optional output interface for results of the execution of the corrected text.

According to embodiments of the invention, the voice-to-text conversion system is implemented as a service which is provided over the Internet to a plurality of end devices. For example, the voice-to-text conversion system can be a cloud computing system using Google's speech-to-text cloud service. This may be advantageous because a functionally powerful API client library is available for this, e.g. for .NET.

The portable device may include client software that is pre-configured to exchange data with the control software. That is to say, the client software on the portable device is configured to send the voice signal to the control software over a network so that the control software can bring about the conversion of the voice signal to text and the technical-language correction of the text and the execution of a function according to the corrected text. The result of the execution of the corrected text can be received by the portable device in response to the sending of the voice signal and can be output through the speaker.

According to embodiments of the invention, the target-language words and phrases stored in the assignment table represent incorrect text outputs of the voice-to-text conversion system generated based on voice inputs of technical words by a plurality of different individuals.

According to embodiments of the invention, the method comprises steps for generating the assignment table. For each of a plurality of technical-language words, at least one reference voice signal is recorded which selectively represents that technical-language word. The reference voice signal originates from at least one speaker. Also for technical-language phrases, at least one reference voice signal, which selectively reproduces this technical-language phrase, can be spoken and recorded by at least one speaker in each case. The further steps are substantially identical for words and phrases, so that in the following, when a technical-language word is mentioned, a technical-language phrase is included. Each of the recorded reference voice signals is input to the voice-to-text conversion system. The input may be made in particular via a network, e.g. the Internet. For each of the input reference voice signals, the device that input the reference signals receives at least one word of the target vocabulary generated by the voice-to-text conversion system from the input reference voice signal. This device may be, for example, any data processing system with a microphone and connection to the voice-to-text conversion system. Preferably, the reference voice signals are input via a device that is as similar as possible to the portable device in terms of the type of its microphone and/or its positioning relative to noise sources to ensure that the same errors are reproducibly generated. The at least one word (which may also be an phrase) of the target vocabulary received for each of the technical language words represents an error conversion, since the target vocabulary of the voice-to-text conversion system does not support the technical-language words. Finally, the assignment table is generated as a table that assigns to each of the technical-language words for which at least one reference voice signal was recorded, the at least one word of the target vocabulary in text form returned from the voice-to-text conversion system for that technical-language word.

This may be advantageous because a table can be modified and supplemented very easily without having to change a source code, recompile a program or retrain a neural network. Even if another voice-to-text conversion system is used, only the appropriate client interface needs to be adapted and the table's technical-language phrases re-entered by one or more speakers via a microphone and transmitted to the new voice-to-text conversion system. The incorrect words and phrases of the target language returned by this new system form the basis for the new assignment table. It is thus possible to functionally extend any everyday-language voice-to-text conversion system in such a way that spoken texts containing technical-language words and phrases are also correctly converted to text, without profound or complex changes and without retraining speech software.

The assignment table can be stored, for example, as a table of a relational database or as a tab-delimited text file or as another functionally comparable data structure.

According to embodiments of the invention, for each of at least some of the technical-language words (or technical-language phrases), a plurality of reference voice signals are recorded, each from different speakers. The plurality of reference voice signals reproduce that technical-language word (or phrase). The assignment table assigns each of at least some of the technical-language words (or phrases) to multiple words (or phrases) of the target vocabulary in text form. The multiple words (or phrases) of the target vocabulary represent miscommunications produced by the voice-to-text conversion system for the different speakers depending on their voice.

For example, a specific technical word such as "1,2-methylenedioxybenzene" can be read aloud by 100 different people and each recorded with a microphone as a reference voice signal. Preferably, these persons are those who are familiar with the pronunciation of chemical phrases. There are then 100 reference voice signals for this one substance name. Each of these 100 reference voice signals is sent to the voice-to-text conversion system and, in response, 100 words or phrases of the target vocabulary are returned, all of which do not correctly represent the actual technical language name. Often the 100 words returned will be identical, but not always. Different people have different voices, i.e. the voice input differs in terms of emphasis, volume, pitch and articulation. Therefore, it is possible that a given voice-to-text conversion system will return several different, incorrect words or phrases for a given technical-language word (or phrase), all of which will be included in the assignment table.

Taking into account the voice input of many different people for the creation of the assignment table may be advantageous, as this better takes into account the variability of human voices, and thus an improved error correction rate can be achieved.

According to embodiments of the invention, the at least one laboratory device is a plurality of laboratory devices. The laboratory devices are each selected from a group comprising:
  an analysis station designed to analyse chemical substances or mixtures of substances; and/or
  a synthesis station designed to perform a synthesis of chemical substances or mixtures of substances; and/or
  a pre- or post-processing station designed to purify, combine with other substances, dilute, concentrate or otherwise modify a chemical substance before or after an analysis or synthesis step so as to enable a subsequent process step or transport step.

According to embodiments of the invention, the at least one laboratory device is a plurality of laboratory devices, each of which serves as a processing station for a chemical substance. The laboratory devices and optionally also the at least one laboratory software module may be part of a laboratory facility which additionally also comprises a transport unit. The transport unit is designed to transport the substances used for a synthesis or analysis to the processing stations in order to enable the processing stations to subject the substances to at least one processing step.

According to embodiments of the invention, the laboratory system further comprises a main control computer of a laboratory facility comprising the at least one laboratory device. The main control computer includes control software configured to orchestrate the processing steps and the transport of the chemical substances based on instructions in the form of a structured text by the laboratory devices of the laboratory facility.

According to embodiments of the invention, the control software comprises an NLP processor (NLP=Natural Language Processing) or is interoperable with an NLP processor connected via a network. Here, for a software application to be interoperable with another software application this means that the interfaces and routines of the two interoperable software applications are coordinated and adapted to each other such that both can exchange requests, control commands and data together in a coordinated manner such that through this coordinated exchange a particular software-based function is performed and its result is returned to the requesting software application. The control software is configured to use the NLP processor to transform the corrected text into a structured text that can be interpreted by a target system. The target system is the at least one laboratory software module, and/or the at least one laboratory device, and/or a control software of a main control computer of a laboratory facility comprising the at least one laboratory device. The control software is configured to receive, from the NLP processor, the structured text formed by the NLP processor on the basis of the corrected text and to input it into the target system. The input of the structured text into the target system causes the target system to perform a laboratory-related software and/or hardware function.

For example, M. Hummel, D. Porcincula and E. Sapper describe, in the European Coatings Journal (Jan. 2, 2019) in the article "NATURAL LANGUAGE PROCESSING. A semantic framework for coatings science—robots reading formulations", a transformation of natural-language text input into structured text using syntax parsers, POS tagging and other techniques.

For example, the target system may be the at least one laboratory device and a transport unit, which are prompted by the input of the structured text to perform a plurality of processing steps and the transport of the chemical substances between the laboratory devices according to the information contained in the structured text.

According to another example, the target system is a control software of a laboratory facility and the input of the structured text prompts it to perform a software function according to the information contained in the structured text. The software function may be, for example, the calculation of certain concentrations or other parameters used in the course of performing certain analyses and/or syntheses defined in the text, e.g. to configure or calibrate a laboratory device accordingly or to adjust pH values and viscosities.

According to another example, the target system is a chemical database of the laboratory facility, which contains results of analyses and synthesis already performed by the facility. The input of the structured text causes it to perform a database search for the information and terms contained in the structured text. The search results can be returned directly to the user as a result via the control software or may contain input for further data processing steps, e.g. for simulation and prediction of advantageous formulations based on the searched substances.

According to embodiments, the laboratory system includes a chemical facility for the analysis and/or synthesis of chemical substances and/or a facility for the production of substance mixtures, in particular paints and varnishes. The system also includes the main control computer with the control software. The at least one laboratory device and the at least one laboratory software module are part of the high-throughput facility and may be controlled and managed by the control software via the control software. The facility is designed to interpret the corrected text as a specification of the synthesis or as a specification of the components of the substance mixture or as a specification of the analysis to be performed.

The facility may be a high-throughput facility (HTE facility), e.g. a high-throughput facility for the analysis and production of paints and varnishes. For example, the HTE facility may be a system for automatic testing and production of chemical products as described in WO 2017/072351 A2.

The output of the corrected text or a structured text into which the corrected text has been converted to the control software of the facility causes the control software to control one or more laboratory devices and/or one or more laboratory software modules of the facility as specified in the corrected text. This may be particularly beneficial in the context of a biological or chemical laboratory, as the voice input is processed in such a way that it can be forwarded directly to, and correctly interpreted by, a technical system without the user having to remove gloves, for example, for this purpose. For example, the laboratory device may be a device for determining the oil number of a pigment or a device for determining the viscosity of a varnish.

The facility may, for example, be designed to perform one or more of the following process steps fully automatically in response to an input of the corrected text or the structured text obtained therefrom via a machine-to-machine interface:
  rheological analyses of substances and substance mixtures;
  measurement of the storage stability of substances and substance mixtures, in particular on the basis of inhomogeneities and the tendency of liquid substance mixtures to settle; for example, these analyses can be carried out using optical measurements in cuvettes after sampling;
  pH-value determination of substances and substance mixtures;
  foam tests of substances and substance mixtures, in particular measurement of the defoaming effect and measurement of the foam degradation kinetics;
  viscosity measurements of substances and substance mixtures; the viscosity measurement can include an automatic dilution step, especially in the case of highly viscous substances or mixtures, since the viscosity in a diluted solution is easier to determine; the viscosity of the original substance or substance mixture is calculated on the basis of the viscosity of the diluted solution;
  measurement of the rub-out behaviour (abrasion test) of the substance or substance mixture, especially of the finished product;
  measurement of colour values of substances and substance mixtures using, for example, a spectrophotometer working with light scattering (so-called L-A-B value), haze and gloss;
  layer thickness measurement of substances and substance mixtures applied to a surface under various defined parameters (temperature, humidity, surface condition of the surface, etc.);
  image analysis method of images of substances and substance mixtures, especially for characterising substance surfaces, e.g. number, size and distribution of air bubbles or scratches in paints and varnishes.

The substances and substance mixtures may be, in particular, substances and substance mixtures used for the production of paints and varnishes. In addition, the substances and substance mixtures may be the end products, e.g. paints and varnishes in liquid or dried form, as well as intermediate products and solvents used.

According to embodiments of the invention, the operation without manual intervention comprises converting the voice input into a text. In particular, the conversion is to a natural-language text.

The at least one laboratory software module may be designed, for example, as a chemical substance database that is designed to interpret the input text as a search input and to determine information about the search input in the database and return it to the control software as a result. The database may be, in particular, a database management system (DBMS), e.g. MySQL or PostgreSQL.

Additionally or alternatively, the laboratory system may contain a laboratory software module which is a simulation software. The simulation software is designed to simulate properties of chemical products, in particular of varnishes and paints, based on a given substance mixture specification. The simulation software is designed to interpret the input text as a specification of the product for which the properties are to be simulated.

Additionally or alternatively, the laboratory system may include a laboratory software module configured as a control software of a laboratory facility containing the at least one laboratory device. The control software is installed on a main control computer. For example, it may be the control software already described herein for embodiments. The control software is designed to prompt the laboratory devices and a transport unit of the laboratory facility to perform and orchestrate a plurality of processing steps and the transport of the chemical substances between the laboratory devices in accordance with the information contained in the input text.

The laboratory facility may be designed as an HTE facility for controlling chemical analyses and/or syntheses and/or for producing substance mixtures, in particular paints and varnishes. The control software is designed to interpret the corrected text or a structured text extracted from it as a specification of an analysis or of the synthesis or of the components of the substance mixture.

In addition or alternatively, the laboratory system may contain a laboratory software module that is designed to perform simple data processing steps of data exchanged between components of the laboratory system in the context of an analysis or synthesis. This may be, for example, the conversion, checking and/or addition of control commands from the control software to the laboratory devices, a storage, checking or normalisation of measurement data or similar data processing steps.

The text input into the laboratory device or laboratory software module in each case may be the corrected text or a structured text generated by an NLP processor from the corrected text.

According to embodiments, the control software is configured to use at least some corrected texts, e.g. texts containing a specific keyword such as "Internet search", as input to an Internet search engine. The control software receives the results of the search, e.g. by parsing a browser window, and forwards the results for output to a target system in the vicinity of the user, e.g. the portable device with the speaker According to embodiments of the invention, the control software includes a registry of accounts of a plurality of users registered with the control software. The control software includes a voice recognition function to recognise each of the registered users by their voice. The control software is designed to enable the user to operate without manual intervention, by speaking into the microphone, only the laboratory device and/or the laboratory software module that this user is authorised to operate.

This may be advantageous because access control and management of the laboratory devices and laboratory software modules are seamlessly interwoven by making both dependent on a user's voice. There is no need to remember or securely store passwords or special access tokens.

According to embodiments of the invention, the control software enables a user to select a laboratory device from a plurality of laboratory devices by entering keywords as part of the voice input, in particular laboratory device names and/or room names, and to selectively control its functions through the voice input. For example, the control software is configured to analyse the corrected text for predefined keywords. If a key term is recognised, the control software forwards the corrected text as natural-language text or structured text to precisely this recognised laboratory device or its control software. This may be advantageous because a variety of different laboratory devices can be controlled using the same language-based interface.

According to embodiments of the invention, the control software is configured to automatically convert the corrected text created based on the user's voice input into a structure that can be correctly interpreted by the target system intended as the target system for this text input. For example, the control software dynamically recognises that the user, in the voice input, by mentioning the name of a particular laboratory device or a laboratory facility, has selected it as a target system from a variety of available target systems to perform a particular function. For each of the target systems, the control system has a format stored that is required as input format by the particular target system and automatically transfers the corrected text or the structured text obtained from it into the required format of the dynamically recognised target system. For example, a first laboratory device may require certain parameters in the form of an XML file as input. Another has an NLP processor and may use the corrected text directly as input. Another laboratory device requires certain parameter values or formulations in tabular form. This may be advantageous because the user can enter a voice input in the normal syntax of natural-language sentences. The user therefore does not have to laboriously memorise the required syntax of the individual laboratory devices and speak "differently" to each individual device. A special adaptation of the user's language structure to the vocabulary or syntax of the particular laboratory devices is therefore not necessary. The user can enter his input in the speech syntax he is used to, which he would also use in conversation with colleagues. The adaptation to the special requirements of the interfaces of the individual laboratory devices is carried out by the control software.

In another aspect, the invention relates to a method for controlling a laboratory device and/or a laboratory software module. The method comprises:

providing at least one laboratory device and at least one laboratory software module, wherein the at least one laboratory device is designed to analyse and/or synthesise a chemical substance, wherein the at least one laboratory software module is designed for processing data obtained from the at least one laboratory device;

providing a data processing device with control software that provides a user with an interface for operating the at least one laboratory device and/or the at least one laboratory software module; and providing a portable device with microphone, the device being connected interoperably to the control software via a network, the device being designed, in interoperation with the control software, to allow the user to operate the at least one laboratory device and/or the at least one laboratory software module without manual intervention, by speaking into the microphone.

According to embodiments, providing the device includes placing the portable device within the same space as the at least one laboratory device and/or placing the portable device in the same space as a main control computer of a laboratory facility that includes the at least one laboratory device.

A "structured text" is understood here to be a text, especially an ASCII text, which contains words and phrases of a certain meaning at predefined positions. A structured text can, for example, take the form of a comma-separated file, a table, an XML document or the like. A structured text can be interpreted and processed more easily by machines and computers than natural-language text.

A "natural language text" is understood here to be a text, especially an ASCII text, that is written in a language spoken by humans and typically consists of complete sentences.

An "NLP processor" is a software program or function that is able to understand "natural-language" texts, i.e. to process them in such a way that the relevant information contained in the text can be extracted from the text and optionally transformed into other formats, e.g. a structured text format. An NLP tool is thus able to process texts consisting of complete sentences as well as to extract information from a single sentence.

A "transport unit" is understood here to be an automatic system consisting of one or more components that can transport chemical substances in liquid and/or solid form and optionally also other objects such as consumables or containers from one processing station to the next. The transport unit can be, for example, a robot arm, an ensemble of robot arms, a conveyor belt, an ensemble of conveyor belts or combinations thereof. The transport unit can be part of a high-throughput system and can be controlled by control software. A processing unit can be a laboratory device for the analysis or synthesis of chemical substances or a device for the pre- and post-processing of these substances (dilution, concentration, dyeing, mixing, etc.).

A "voice-to-text conversion system" is a data processing system designed for converting voice signals from a human into text. The data processing system can, for example, consist of a combination of hardware and software and can, for example, be a cloud- or server-based computer system that provides a voice-to-text conversion service to one or more client devices over a network.

An "operation without manual intervention" of a device is an operation that does not involve any manual interaction on the part of a user with the device or a human-machine interface of this device. It is therefore a "touch-free", "contactless" operation.

A "single-board computer" or "single-board processor" is a computer system in which all the electronic components required for operation are combined on a single printed circuit board. Typically, the power supply is the only component housed separately.

A "voice signal" is an electronic signal recorded by a microphone when a human speaks into the microphone.

A "virtual laboratory assistant" is a software or software routine that is operatively connected to one or more laboratory devices and/or software programs located in a laboratory in such a way that information can be received from these laboratory devices and laboratory software programs and commands to perform functions can be sent from the laboratory assistant to the laboratory devices and laboratory software programs. A laboratory assistant thus has an interface for exchanging data with and controlling one or more laboratory devices and laboratory software programs. The laboratory assistant also has an interface to a user and is configured to enable the user to facilitate use, monitoring and/or control of the laboratory devices and laboratory software programs via the interface. For example, the interface to the user can be an acoustic interface or a natural-language text interface.

Preferably, a "virtual laboratory assistant" includes functions to make the interaction between the virtual assistant and the human as similar as possible to a human-human interaction. For example, the virtual laboratory assistant can have a software function to read aloud text in a substantially natural voice. The text read aloud can include, for example, the results of an execution of a function which are output through a speaker of a portable device. Additionally or alternatively, the virtual laboratory assistant can be configured to search received voice signals or text generated therefrom for keywords and to invoke specific hardware or software functions depending on those keywords. For example, one of these keywords can be a name, e.g. a common human first name, which is interpreted by the virtual laboratory assistant as its own name and is understood as a command addressed to it to perform or call up a specific function.

Here, the term "Laboratory device" means electronic devices used in a laboratory to carry out chemical process steps such as syntheses or analyses or other processing steps to prepare or post-process a substance with a view to the next/previous processing step.

A "laboratory facility" is understood here to be a system consisting of a plurality of laboratory devices, a transport unit and one or more software modules, which is capable of controlling the laboratory devices and laboratory software modules together in an orchestrated manner in order to carry out a chemical workflow automatically or semi-automatically. The workflow can be, for example, a synthesis workflow or an analysis workflow or a combination of both workflows.

A "laboratory software module" is understood here to be a software application, a sub-module of a software application or a software routine which is configured to process data supplied by a laboratory device as measurement data or used as input parameters. Preferably, a laboratory software module is a manual and/or functional component of a laboratory device or a laboratory installation.

A "vocabulary" is understood here to mean a language space, i.e. a set of words that an entity, e.g. a voice-to-text conversion system, can make use of.

A "word" is understood here as a coherent sequence of characters that occurs within a certain vocabulary and represents an independent linguistic unit. In natural language, a word—in contrast to a sound or a syllable—has an independent meaning.

An "phrase" is understood here as a linguistic unit consisting of two or more words.

A "technical-language word" or "technical word" is understood here as a word from a technical vocabulary. A technical-language word does not belong to the target vocabulary and is typically not part of the general-language vocabulary.

The phrase that a voice-to-text conversion system only supports the conversion of voice signals into a target vocabulary means that words of another vocabulary either cannot be converted into text at all or are only converted into text with a very high error rate, wherein the error rate is above an error rate limit value per word or phrase to be converted, which must be considered as the maximum tolerable value for a functioning conversion of speech into text. For example, this limit value can be an error probability per word or phrase of more than 50%, preferably already more than 10%.

A POS tag (or part-of-speech tag) is understood here as a special marking ("label") assigned to each word in a text corpus to indicate the part of speech, and often other grammatical categories such as tense, number (plural/singular), capitalisation, etc., that this word represents in its particular text context. A set of all POS tags used in a corpus is called a tagset. Tagsets for different languages are typically different. Basic tagsets contain tags for the most common language components (e.g. N for noun, V for verb, A for adjective, etc.).

A "portable device" is understood here to be a portable, preferably battery-powered, data processing device that can be freely positioned and that can be connected to a network, e.g. the Internet or Intranet of an organisation, preferably wirelessly. For example, so-called "smart speakers" with microphone and/or single-board systems such as Raspberry Pi computers are used as "portable device". However, it is also possible for a user to use their smartphone as a portable device, wherein the smartphone has a microphone and client software interoperable with the control software.

BRIEF DESCRIPTION OF THE DRAWINGS

In the following figures, embodiments of the invention are explained in more detail in an exemplary manner.

DETAILED DESCRIPTION

Figure 1:
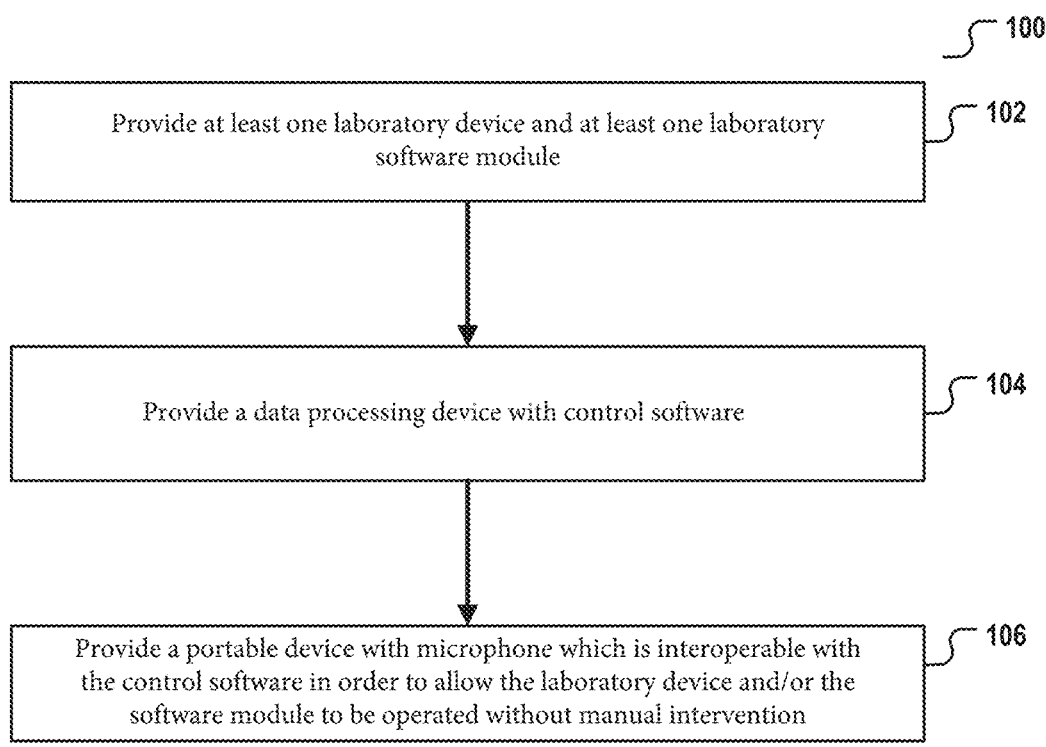
FIG. 1 shows a flow diagram of a method for controlling laboratory devices and laboratory software modules.

FIG. 1 shows a flow diagram of a computer-implemented method for voice-based control of laboratory devices and laboratory software modules.

In a first step 102, one or more laboratory devices and one or more laboratory software modules are provided.

The laboratory devices can be individual devices or processing units within a complex laboratory facility. The laboratory devices can each be configured and equipped to perform one or more process steps in the context of the analysis and/or synthesis of substances or substance mixtures or for the preparation and post-processing of substances and substance mixtures within complex analysis or synthesis workflows.

Analogously, the laboratory software modules can be individually installable software applications, e.g. simulation software, which can make statements or predictions regarding the chemical, physical, haptic, optical or other properties of the laboratory devices based on data obtained from them. The software modules can also be provided in the form of a DBMS with a database, wherein the database has stored the results of the previous analyses and syntheses of the laboratory devices and its content can be used, for example, to perform database searches for substances (e.g. paints and varnishes) that have already been produced and for which the properties are known. The search query can be, for example, a search for all varnishes with a viscosity below a limit value specified in the search query. The software modules can also be modules and functions of a larger software application, e.g. of a control software of a complex laboratory facility.

In a further step 104, a data processing device with control software is provided. The control software provides one or more users with an interface for operating the at least one laboratory device and/or the at least one laboratory software module. The data processing device with the control software can be located in the same room or laboratory area as the laboratory device or laboratory facility that includes the laboratory device. For example, the data processing device can be a desktop computer or a server. Preferably, however, the data processing device is set up in another space, e.g. a data centre of the organisation operating the laboratory or in the data centre of an external cloud storage provider. However, access to this data processing device and the control software, e.g. for maintenance purposes, can be provided from a computer within the laboratory area, for example.

In step 106, a portable device with microphone is provided and is set up to be connected and interoperable with the control software via a network, e.g. the Internet or the Intranet of said organisation. The device is designed to enable the user, in interoperation with the control software, to operate the at least one laboratory device and/or the at least one laboratory software module without manual intervention, by speaking into the microphone. The portable device is preferably provided in such a way that the device is placed in the vicinity of the working area of a laboratory worker from which this laboratory worker wishes to control the laboratory device or where the laboratory worker otherwise carries out his laboratory work. It is also possible to position the device with the microphone at a central location within the laboratory area, from which voice inputs from all areas of the room or laboratory area can be received and recorded by the microphone to a large extent equally well.

According to embodiments, providing the device includes placing the portable device, e.g. a single-board computer with microphone, within the same room as the at least one laboratory device and/or placing the portable device in the same room as a main control computer of a laboratory facility that includes the at least one laboratory device.

Said steps can be performed in any order. They allow operation, without manual intervention, of one or more laboratory devices and associated laboratory software modules by voice input from any area of a laboratory, without the need to remove gloves for this purpose. By having the control software convert the voice signal recorded by the microphone into a natural-language text by a voice-to-text conversion system, which is then corrected by special text correction steps in such a way that even the technical-language words, e.g. of the chemical industry or of special sub-fields such as paint and varnish production, are correctly reflected in the text in the voice input.

The steps performed by the control software, laboratory devices and laboratory software modules can vary slightly in different embodiments of the laboratory system, and the laboratory system can include other components, e.g. an external text correction system and/or an NLP processor to transform the corrected natural-language text into structured text. However, in some embodiments, the laboratory facility itself includes such an NLP processor that performs this transformation, so that the corrected natural-language text can be input directly into the laboratory facility control software.

Figure 2:
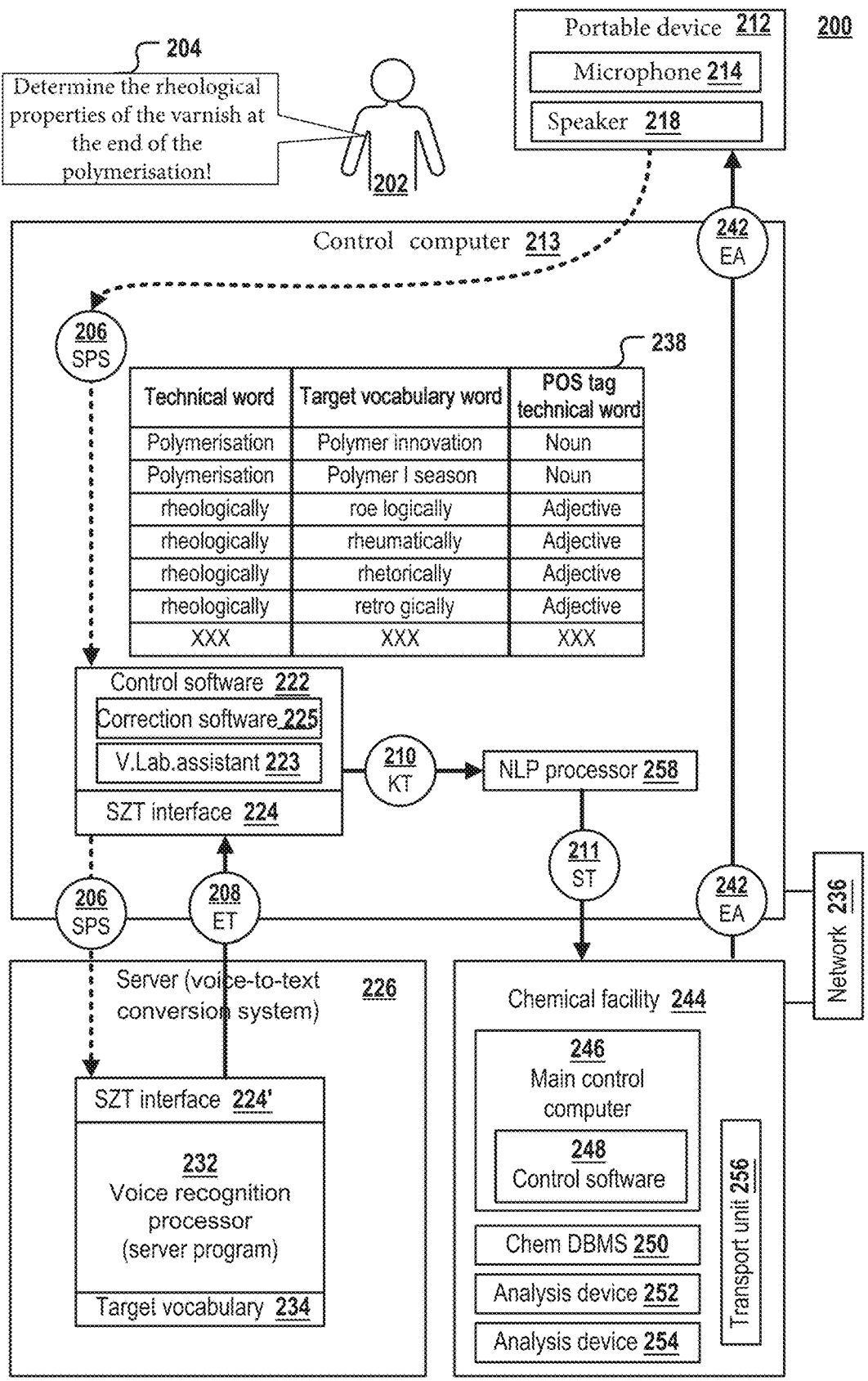
FIG. 2 shows a block diagram of a distributed system for voice-based control of laboratory devices and laboratory software modules.

FIG. 2 shows a block diagram of a distributed system 200 for voice-based control of laboratory devices 252, 254 and laboratory software modules 248, 250. The system 200 comprises laboratory devices 252, 254 and laboratory software modules 248, 250, a control computer 213 with control software, and a portable device 212 with microphone. Optionally, the system can include other portable devices 212 that are substantially identical in terms of construction and function. Optionally, the system can also include a main control computer with control software for controlling the laboratory devices. Optionally, the system 200 can include correction software 225, which can be implemented as a function of the control software or as a stand-alone locally or remotely installed software application. Optionally, the system 200 can also include the NLP processor 258. Optionally, the system 200 can also include the voice-to-text conversion system 226.

The laboratory devices and laboratory software modules included in the system 200 are controlled by a user 202, e.g. a laboratory worker, who is in physical proximity to a portable device 212 with microphone 214, by voice input 204. For example, the user can input the command "Synthesise the varnish called <VARNISH NAME> and determine the rheological properties of the varnish after synthesis!" into the microphone. The voice signal 206 recorded by the voice input microphone is routed by the portable device 212 over a network 236, such as the Internet or an Intranet, to the control software 222 installed on a control computer 213. This forwards the voice signal 206 over the network to a general-language voice-to-text conversion system 226, which converts the received voice signal 206 into a text 208, the words and phrases of which are taken exclusively from a general-language target vocabulary 234 that does not include the technical-language words such as the name of the varnish or the word "rheological". For example, the voice-to-text conversion system 226 can be configured as a cloud-based computer system that provides the conversion to multiple clients in the form of a software-based service, referred to herein as a "voice recognition processor" 232. The voice-to-text conversion system 226 can be, for example, Google's cloud computer system providing Google's speech-to-text cloud service over the Internet. Thus, the interface 224 in this case is a cloud-based API from Google. The voice-to-text conversion system returns the recognised text 208 to the control software 222.

In accordance with the embodiment shown in FIG. 2, the control software includes a correction function 225. This has access to an assignment table 238, in which a plurality of technical words and phrases are each assigned to one or more words or phrases of the target vocabulary.

In the assignment table 238, words in text form are assigned to each other. More specifically, the assignment table assigns at least one word from the target vocabulary to each of a plurality of technical-language words or technical-language phrases. The at least one word of the target vocabulary associated with a technical-language word (or technical-language phrase) is a word or phrase that the voice-to-text conversion system falsely recognises (and has previously falsely recognised when the table was created)

when that technical-language word is input to the voice-to-text conversion system in the form of an audio signal.

Optionally, POS tags can also be assigned to the technical phrases and are optionally evaluated and taken into account by the correction function 225 in the course of text correction. The correction function 225 can also be formed as separate correction software applications 225, installed on the control computer 213 and with which the control software 222 is interoperable.

The control software 222 transfers the received text 208 to the correction function or correction software 225 and prompts it to correct the text 208 using the assignment table 238. In the course of the correction, words and phrases of the target language that are incorrectly recognised according to the table are replaced in each case by assigned technical-language words and phrases. The result is a corrected text 210, which is either transmitted directly by the control software 222 to a specific target system, for example a chemical facility 244, or which is first forwarded to an NLP processor 258.

Figure 3:
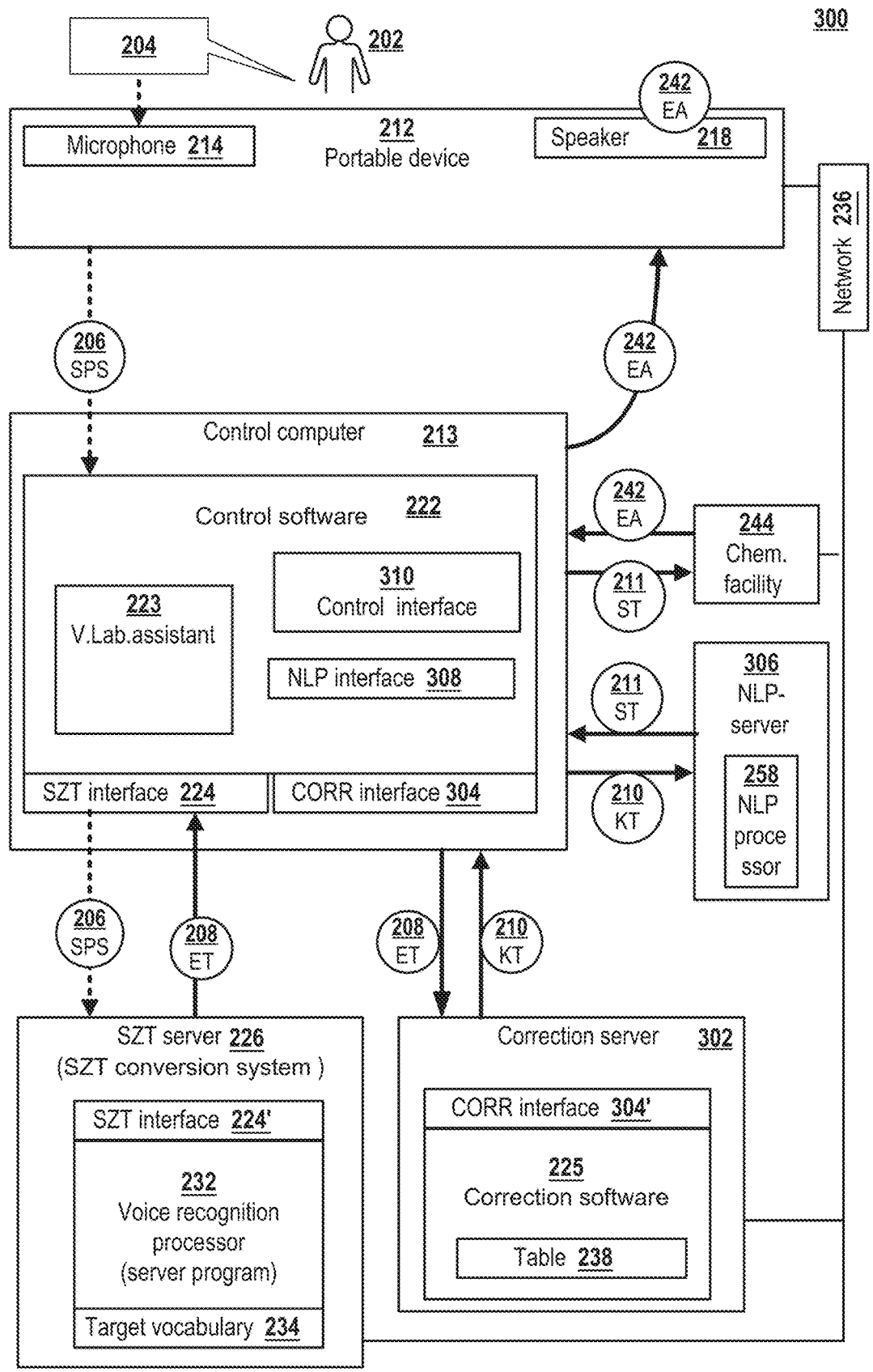
FIG. 3 shows a block diagram of an alternative distributed system for voice-based control of laboratory devices and laboratory software modules.

The NLP processor shown in FIG. 2 is installed on the control computer 213. However, according to alternative embodiments, as shown in FIG. 3 for example, the NLP processor can also be provided as a service over a network. The NLP processor analyses the syntactic structure of the corrected text 210 to detect the semantic content of the corrected text and to extract relevant information from it and convert it into a structured text 211. The step of transferring the corrected text 210 into a corrected structured text 211 can be advantageous because many laboratory systems and laboratory software modules available on the market today cannot yet correctly interpret natural-language text. However, many target systems have an input interface for structured text, for example for tables or XML files of a certain predetermined structure. In other embodiments, the target system contains its own NLP processor so that the corrected text 210 can be input into the target system in natural-language form. In this case, the control software sends the corrected text 210 directly to the target system.

For example, the target system can be a single laboratory device or a laboratory facility containing multiple laboratory devices. The laboratory facility 244 shown in FIG. 2 can be a High Throughput Environment (HTE) facility that includes a plurality of laboratory devices 252, 254 and one or more laboratory software modules 250, 248.

For example, the laboratory devices 252, 254 can be analytical devices configured to perform various chemical analyses (for example, viscosity, pH, colour, surface structure, layer thickness). For example, the software module 250 can be a chemical database that interprets the input text 211 or 210 as a search query and performs a corresponding search within the chemical substance database. The laboratory software module 248 is control software installed on a main control computer 246 of the chemical facility 244, and is configured to coordinate the process steps to be performed by the individual laboratory devices of the facility. For example, the control software 248 controls not only the analytical steps performed by the analytical devices, but also the work of a transport unit 256 that transports substances and intermediate products from one processing station to the next within the chemical facility 244.

The control of chemical facilities by means of a voice input can be particularly advantageous, since these facilities are now able to produce a specific chemical product, for example a specific paint or a specific varnish, largely automatically on the basis of a specific formulation. It is thus possible to enter a formulation for the production of a particular chemical substance or substance mixture by voice input, thereby prompting the chemical facility 244 to automatically produce the corresponding substance or substance mixture. Similarly, it is possible to initialise corresponding analyses of substances by voice input or to control their execution, if necessary to interrupt, modify or stop them.

The internal database 250 can be used not only to store chemical substances and substance mixtures and their properties, but also to store the corresponding formulations. The database 250 can thus contain, for example, formulations of paints and varnishes as well as their raw materials and their respective physical chemical, optical and other properties. In addition, other relevant data can be stored in the database, for example product data sheets of the manufacturers of the substances, safety data sheets, parameters for configuring individual modules of the HTE system for the analysis or synthesis of certain substances or products and the like. The HTE system is designed to perform analyses and syntheses based on formulations and instructions input in text form.

In some embodiments, one or more laboratory devices of the chemical facility have their own interface through which they can directly receive a natural-language or structured corrected text 210, 211 from the control software. In some other embodiments, the laboratory devices of the chemical facility can receive the corrected text 210, 211 only indirectly from the control software 222 via the control software 248.

According to embodiments, the voice input includes keywords that the control software 222 uses to determine the number and identity of each required target system. The corrected text is then sent by the control software in natural-language or structured form to each of the identified target systems. For example, a user can determine which target device the control software sends the corrected text to by entering a key term "TARGET SYSTEM" followed by the name of the particular target system (laboratory device or software module). In addition or alternatively, however, the control software itself can also search for key terms and autonomously determine a suitable target system based on these terms. For example, the voice input can simply specify a particular type of synthesis and the control software dynamically decides which of a variety of laboratory devices that can be used for synthesis will be used for the requested synthesis. For example, the decision can be made based on the current workload, so that a laboratory device is selected that is currently underutilised or not utilised at all.

Preferably, the results 242 of the execution of a particular hardware or software function are returned from the target system to the control software 222. The control software can now return the result of the execution of the function to the user 202. Various channels are possible for this purpose. For example, the user can be sent an e-mail, an SMS or a message of other format containing the results of the execution of the function. According to the embodiment shown in FIG. 2, the results 242 are—at least also—(or exclusively) returned to the portable device 212 and output via its speaker 218. This is particularly advantageous as it allows the laboratory worker 202 maximum freedom of movement both in terms of inputting control commands, chemical formulations and search queries and in terms of receiving the results of the execution of a corresponding hardware or software function. For example, the user can be in a specific working area of a laboratory room and, in parallel with his manual activity, can initiate the analysis of a specific substance by voice command. The result of the analysis is communicated acoustically via the speaker. It is therefore not necessary for the user to interrupt his current manual activity to request the results. Rather, the user can enter into a regular dialogue with the control software and, for example, after receiving the result that a certain synthesis has been completed, can also initialise corresponding analysis steps for the generated substance by voice input. The efficiency of laboratory work can thus be drastically increased, as the user is enabled to work in parallel to a greater extent and, for example, to initiate and control the control of complex syntheses and analyses in parallel to other laboratory work.

Common activities within a laboratory that can be controlled by voice input according to embodiments of the invention relate, for example, to the following activities and voice inputs given as examples thereof:

The laboratory worker started an analysis of a certain varnish with regard to its rheological properties the previous day and now wants to query the result stored in the database of the HTE system. Possible voice input: "CONTROL COMPUTER, show me the results of the rheological analysis of 24 Feb. 2019 by the HTE facility in room 22".

The laboratory worker wants to save costs and is considering replacing a certain solvent «SLV EXP» with a more economical one «SLV ECO». The name «SLV ECO» is a trade name of the manufacturer. However, the laboratory worker is not sure whether the more economical solvent is suitable for the varnish that is to be produced and would like to consult the product data sheet in which further information regarding the chemical and physical properties of the more economical solvent is specified. Possible voice input: "CONTROL COMPUTER, show me the product data sheet of «SLV ECO»" or "CONTROL COMPUTER, show me the product data sheet of «SLV ECO» stored in the HTE database of room 22".

After reviewing the product data sheet of the solvent «SLV ECO», the laboratory worker is of the opinion that the solvent can probably be used instead of the more expensive solvent for the production of the particular varnish. However, it is likely that the formulation will need some adjustment as several parameters such as pH, rheological properties, polarity and others will differ from those of the more expensive solvent. Since these properties are interrelated with each other, it is not possible for the laboratory worker to identify the necessary adjustments to the formulation based on theoretical considerations. Carrying out test series is labour-intensive and costs time. However, the laboratory has software that can predict (simulate) the properties of a chemical product, for example paints and varnishes, based on a specific formulation. The simulation can be based on CNNs (convolutional neural networks), for example. The laboratory worker would like to use this simulation software to simulate the predicted properties of a varnish based on a known formulation in which the expensive solvent has been replaced by the economical one. Possible voice input: "CONTROL COMPUTER, prompt the HTE simulation software to calculate the properties of a varnish with the following formulation: 70.2 g naphthenic oil, 4 g methol n-amyl ketone, 1.5 g n-pentyl propionate, 1 g Ultrasorb, 50 g «SLV ECO», [ . . . ]".

The simulation has shown that the economical solvent is not suitable for the production of the varnish. The laboratory employee now wants to search the Internet for other solvents that can replace the expensive solvent without affecting the quality of the product in order to reduce costs. Possible voice input: "CONTROL COMPUTER, search the Internet: «high viscosity solvents for paint production»".

According to embodiments of the invention, all these inputs and commands to the various execution systems can be made without the user having to leave the laboratory room and/or take off gloves for this purpose.

The voice inputs given as examples above mostly contain both general-language and technical-language words and phrases. For example, the words or phrases "rheological", "naphthenic oil", "methol n-amyl ketone" "n-pentyl propionate" are technical chemical terms and «SLV ECO» is a trade name of a chemical product. These words or phrases are typically not included in the vocabulary supported by current general-language voice-to-text conversion systems ("target vocabulary"). Thanks to the subsequent correction by the correction software, it is ensured that the voice inputs are correctly converted into text despite the use of a general-language voice-to-text conversion system 226. The control software performs a variety of coordination and control activities regarding the management and processing of the voice signal and the text generated from it, which vary slightly depending on the system architecture.

FIG. 3 shows a block diagram of an alternative distributed system 300 for voice-based control of laboratory devices and laboratory software modules. The system 300 can include substantially the same components and functions as shown in FIG. 2. Unlike the system shown in FIG. 2, the correction software 255 is not a component of the control software and is not installed locally as a separate software application on the control computer 213, but is provided as a cloud service from a cloud computer system 302 over the Internet. The control software 222 is configured to correct, via a corresponding interface 304, the text 208 received from the voice-to-text conversion system using the assignment table—now stored on the cloud computer system 302—and to receive the corrected text 210.

Figure 4:
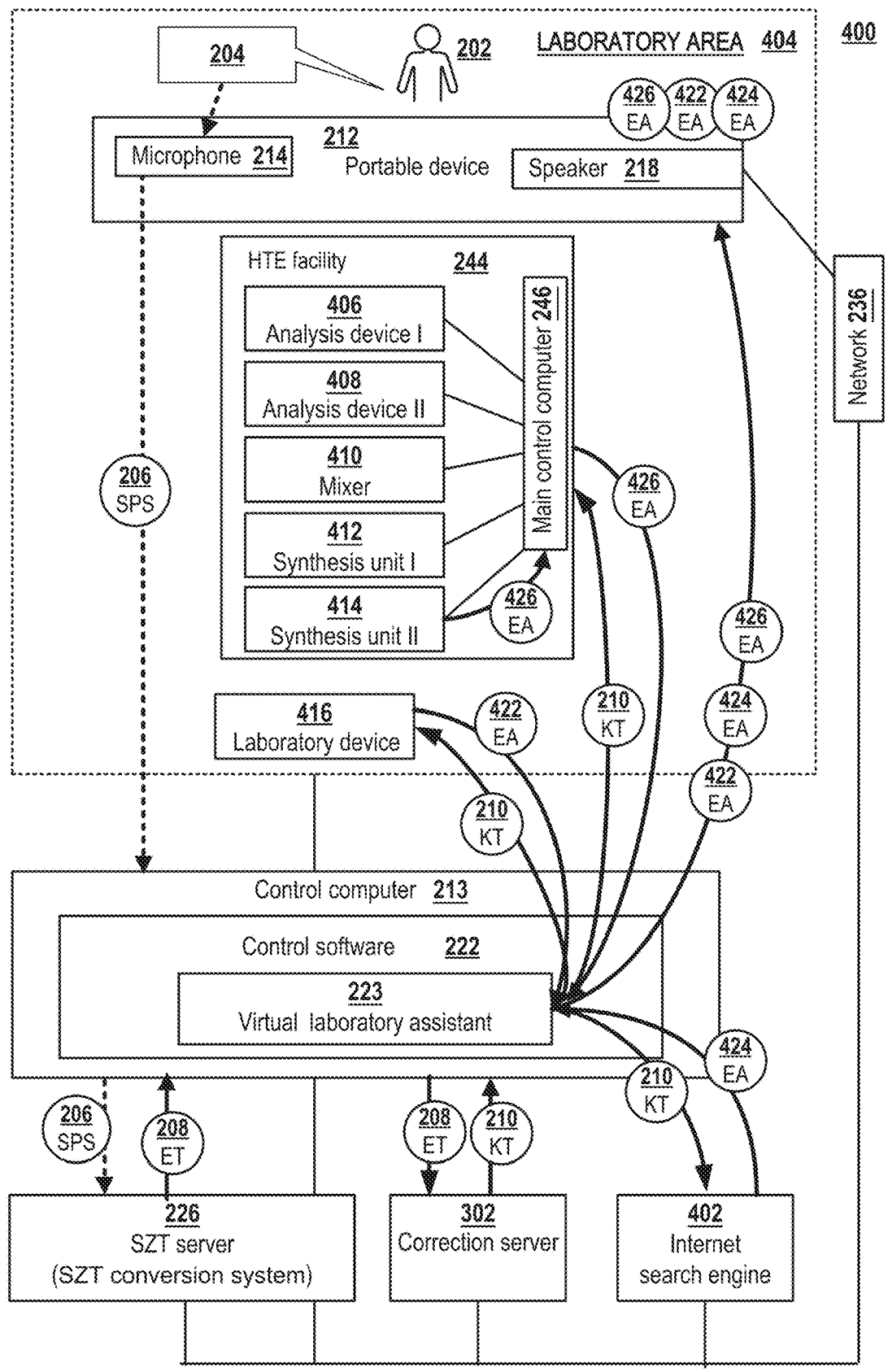
FIG. 4 shows a block diagram of another distributed system for voice-based control of laboratory devices and laboratory software modules.

FIG. 4 shows a block diagram of an alternative distributed system 400 for voice-based control of laboratory devices and laboratory software modules. The data exchange for controlling the individual laboratory devices 406-414 of the HTE system 244 is illustrated in greater detail in FIG. 4.

The laboratory comprises a laboratory area 404 in which there are various stand-alone laboratory devices 416, e.g. a centrifuge, and an HTE facility 418.

The HTE facility includes a plurality of modules and hardware units 406-414 that are managed and controlled by control software on a main control computer 246. The control software of this embodiment serves as a central interface for externally monitoring and controlling the devices included in the HTE facility. The control software 222 on the control computer 213 has access to the control software and is configured to send the corrected text 210, 211 in natural-language or structured form as input to the control software and optionally also to other target systems, such as the laboratory device 416 and/or an internet search engine 402. The generation of a corrected text 210, 211 from a voice input 204 of a user 202 is performed as already described according to embodiments of the invention.

The control software 222 can be implemented as a "virtual laboratory assistant" 223. For example, the virtual laboratory assistant can respond to a name such as "CONTROL COMPUTER", "LUISA" or "EVA". The control software is configured to search the corrected text 210 for keywords and to invoke specific hardware or software functions of a target system depending on those keywords. For example, the control software searches the text 210 for a keyword such as "CONTROL COMPUTER" or "EVA". If the corrected text contains this keyword, the virtual laboratory assistant 223 is prompted to further analyse the corrected text to determine whether the corrected text contains commands to perform a hardware or software function and, if so, by which hardware or software under the control of the control software or laboratory assistant those commands are to be performed. For example, the corrected text can contain names of devices or laboratory rooms that specify to which device and software the command is to be forwarded.

The wording "CONTROL COMPUTER" or other names of the virtual assistant in the voice input can therefore be used analogously to the names "Siri" and "Alexa" of the well-known virtual assistants for "everyday problems" in the field of chemical laboratories to enable more efficient and more reliable control of hardware and software functions.

In one possible implementation example, the evaluation of the corrected text 210 by the virtual laboratory assistant results in an Internet search engine 402 searching for a particular substance specified in the corrected text 210 as a technical-language word or phrase. The corrected text, or specified portions thereof, are input into the search engine by the virtual assistant via the Internet. The results 424 of the Internet search are returned to the control software or the assistant, which forwards these results to a suitable output device in the vicinity of the user 202, for example the portable device 212 with the microphone and a speaker 214. The results are preferably forwarded such that the virtual laboratory assistance, that is to say the control software, reads out the results 424 with a naturally sounding voice to the user via the speaker 214.

In another possible implementation example, the evaluation of the corrected text 210 by the virtual laboratory assistant reveals that the stand-alone laboratory device 416, a centrifuge, is to pelletise a specific substance at a specific speed. The name of the centrifuge and the substance are specified in the corrected text 210 as a technical-language word or phrase, which is sufficient because the centrifuge automatically reads out the centrifugation parameters to be used, such as duration and number of revolutions, from an internal database based on the substance name. The corrected text or certain parts of it are sent by the virtual assistant to the centrifuge 416 via the Internet. The centrifuge starts a centrifugation program associated with the substance and returns a message about the successful or unsuccessful centrifugation in the form of a text message 422. The result 422 is returned to the assistant 223, which outputs it as described for the results 424 via the speaker 214 and optionally also via other output interfaces, e.g. a screen.

In another possible implementation example, the evaluation of the corrected text 210 by the virtual laboratory assistant reveals that the HTE system 244 is to synthesise a specific varnish. The components of the varnish are also specified in the corrected text and consist of a mixture of chemical product trade names and IUPAC substance names. The HTE facility receives the corrected text 210 and autonomously decides to perform the synthesis in the synthesis unit 414. A message about the successful synthesis or an error message is returned as result 426 from the synthesis unit 414 to the control software of the HTE unit and the control software in turn returns the result 426 to the control software or virtual laboratory assistant, which forwards it to a suitable output device, for example end device 312, which outputs these results 426 as described for the results 424 via the speaker 214 and optionally also via further output interfaces, for example a screen.

The software and/or the hardware to which the corrected text 210, 211 is output is preferably software and hardware located within a laboratory 404. However, it is possible that the text or parts thereof are also sent additionally to target systems outside the laboratory, the results of which are designed or suitable for use for a chemical analysis or synthesis.

The voice control of laboratory devices and laboratory software modules associated with them can be used to research and output results of analyses and syntheses already carried out in the laboratory, laboratory protocols and product data sheets in corresponding databases of the laboratory, and to carry out supplementary searches also in the Internet and of public or proprietary databases accessible via the Internet by voice control. Voice commands that include special trade names of chemicals or laboratory devices or laboratory consumables and/or names and adjectives of chemical terminology are also correctly converted into text and can thus be correctly interpreted by the target system. According to embodiments of the invention, a largely voice-controlled, highly integrated operation of a chemical or biological laboratory or a laboratory HTE facility is thus made possible.

The hardware (smart speakers) of well-known voice-to-text cloud service providers pursue the objective of directly controlling and using the services developed by the cloud provider itself. The application in the field of technical vocabulary is currently not developed or is developed only to a very limited extent. All of the system architectures 200, 300, 400 shown here enable the use of existing voice-to-text APIs of various cloud providers by means of their own cloud-provider-independent hardware to enable subject-specific voice recognition and control, on this basis, of laboratory devices and electronic search services in a laboratory.

In the context of the chemical synthesis of paints and varnishes, the efficient retrieval of information regarding chemical substances and a voice-based control of laboratory devices and HTE facilities is particularly advantageous, as a large variety of starting materials is necessary for the production of paints and varnishes, wherein their properties interact with each other in a complex manner and strongly influence the properties of the product. Thus, a large number of analyses, control steps and test series are required in the context of the production of paints and varnishes. Paints and varnishes are highly complex mixtures of up to 20 raw materials and more, for example solvents, resins, hardeners, pigments, fillers and numerous additives (dispersants, wetting agents, adhesion promoters, defoamers, biocides, flame retardants, and others). Efficient procurement of information regarding the individual components and the control of corresponding analysis and synthesis systems can significantly accelerate the production process and the quality assurance of the products.

LIST OF REFERENCE NUMBERS 102-106 Steps
200 Distributed system
202 User
204 Voice input
206 Voice signal
208 Recognised text
210 Corrected text (natural-language)
211 Corrected text (structured text)
212 Portable device
213 Control computer
214 Microphone 218 Speaker
222 Control software
223 Virtual laboratory assistant
224 Voice-to-text interface (client-side)
224' Voice-to-text interface (server-side)
225 Correction software
226 Voice-to-text conversion system/cloud system
232 Voice recognition processor
234 Target vocabulary
236 Network
238 Assignment table
242 Result of the execution of the corrected text
246 Main control computer
248 Control software
250 Chemical database (DBMS)
252 Analytical device
254 Analytical device
256 Transport unit
300 Distributed system
302 Server with text correction service
304 Correction service interface (client-side)
304' Correction service interface (server-side)
308 NLP interface
310 Laboratory facility control interface
400 Distributed system
402 Internet search engine
404 Laboratory area/Laboratory room
406 Analytical device
408 Analytical device
410 Mixer
412 Synthesis unit
414 Synthesis unit
414 Control computer
416 Standalone laboratory device
422 Result of the execution of the corrected text (text form)
424 Result of the execution of the corrected text (text form)
426 Result of the execution of the corrected text (text form)

The invention claimed is:

1. A laboratory system, comprising:
at least one laboratory device which is designed to analyse and/or synthesise a chemical substance;
at least one laboratory software module which is designed to process data obtained from the at least one laboratory device;
a data processing device with control software that provides an interface for operating the at least one laboratory device and/or the at least one laboratory software module; and
a portable device with a microphone, the portable device being connected interoperably to the control software via a network, the portable device being designed, in interoperation with the control software, to allow a user to operate the at least one laboratory device and/or the at least one laboratory software module without manual intervention, by speaking into the microphone,
wherein the control software is configured to
identify at least one target system based on keywords included in a voice signal picked up by the microphone, the at least one target system including the at least one laboratory device and/or the at least one laboratory software module, and the at least one target system being among a plurality of target systems,
determine a first input format corresponding to the at least one target system, each of the plurality of target systems corresponding to a respective input format among a plurality of input formats, and the plurality of input formats including a natural language format,
generate text including specifications based on the voice signal, and
prompt the at least one target system to perform the analysis, synthesis and/or software function in accordance with the text including,
converting the text into the first input format in response to determining the first input format is not the natural language format, and
directly inputting the text into the at least one target system in response to determining the first input format is the natural language format.

2. The laboratory system according to claim 1, wherein the control software is designed as a virtual laboratory assistant for the operation of the at least one laboratory device and the at least one laboratory software module.

3. The laboratory system according to claim 1, wherein the portable device is configured to:
receive the voice signal of the user via the microphone; and
forward the received voice signal to the control software for conversion of the voice signal into a text by the control software or by a voice-to-text conversion system operatively connected thereto.

4. The laboratory system according to claim 3, wherein the portable device further comprises a speaker, wherein the portable device is configured to:
in response to sending the voice signal, receive a result of an execution of a function from the control software, wherein the function was performed in accordance with the text by the at least one target system; and
output the result to the user via the speaker.

5. The laboratory system according to claim 1, wherein the portable device is located within the same room as the at least one laboratory device and/or in the same room as a main control computer of a laboratory facility comprising the at least one laboratory device.

6. The laboratory system according to claim 1, wherein the portable device is a single-board computer.

7. The laboratory system according to claim 1, wherein the control software is configured to:
receive, from the portable device, the voice signal picked up by the microphone on the basis of a voice input, wherein the voice signal includes general-language and technical-language words spoken by the user;
input the received voice signal into a voice-to-text conversion system, wherein the voice-to-text conversion system only supports the conversion of voice signals into a target vocabulary that does not include the technical-language words;
receive from the voice-to-text conversion system a text generated by the voice-to-text conversion system from the voice signal;
generate a corrected text from the received text, wherein the corrected text is generated by the control software alone or by the control software in interpretation with text correction software to which the control software is operatively connected, wherein the corrected text is generated by automatically replacing words and phrases of the target vocabulary in the received text by technical-language words according to an assignment table of words in text form, wherein the assignment table assigns at least one word from the target vocabulary to each of a plurality of technical-language words, wherein the at least one word of the target vocabulary assigned to a technical-language word is a word or a phrase that the voice-to-text conversion system incorrectly recognises when that technical-language word is input in the form of a voice signal; and use the corrected text to prompt the at least one target system to perform the analysis, synthesis and/or software function in accordance with the specifications in the corrected text.

8. The laboratory system according to claim 7, wherein the technical-language words are words from one of the following categories:
   names of chemical substances, especially paints and varnishes;
   physical, chemical, mechanical, optical or haptic properties of chemical substances;
   names of laboratory devices and chemical industry devices;
   names of laboratory consumables and supplies; or
   trade names in the paint and varnish sector.

9. The laboratory system according to claim 7, wherein target-language words and phrases stored in the assignment table represent incorrect text outputs of the voice-to-text conversion system generated on the basis of voice inputs of technical words by a plurality of different people.

10. The laboratory system according to claim 1, wherein the at least one laboratory device is among a plurality of laboratory devices, wherein the laboratory devices are each selected from a group comprising:
   an analysis station which is designed to analyse chemical substances or substance mixtures; and/or
   a synthesis station which is designed to perform a synthesis of chemical substances or substance mixtures; and/or
   a pre-or post-processing station which is designed to modify a chemical substance before or after an analysis or synthesis step so as to enable a subsequent process or transport step.

11. The laboratory system according to claim 1, wherein the at least one laboratory device is among a plurality of laboratory devices each serving as a processing station of a chemical substance, further comprising:
   a transport unit which is designed to transport substances used for synthesis or analysis to the processing stations to enable the processing stations to subject the substances to at least one processing step in each case; and
   a main control computer of a laboratory facility which includes the plurality of laboratory devices, wherein the main control computer includes control software configured to orchestrate the processing steps and the transport of the chemical substances based on instructions in the form of structured text.

12. The laboratory system according to claim 1, wherein the control software comprises an NLP processor or is interoperable with an NLP processor, and wherein the control software is configured to:
   use the NLP processor to transform the text into structured text that the at least one target system is configured to interpret; and
   input the structured text into the at least one target system to prompt said at least one target system to perform a laboratory-related software and/or hardware function.

13. The laboratory system according to claim 1, wherein the at least one laboratory software module is a chemical substance database which is designed to interpret the text as a search input and to determine information regarding the search input in the database and to return it to the control software as a result;

the at least one laboratory software module is a simulation software which is designed to simulate properties of chemical products, in particular of varnishes and paints, based on a predetermined substance mixture specification, wherein the simulation software is designed to interpret the text as a specification of the product for which properties are to be simulated; and/or the at least one laboratory software module is control software of a main control computer of a laboratory system which includes the at least one laboratory device, wherein the control software is designed to prompt the at least one laboratory device and a transport unit to perform a plurality of processing steps and transport chemical substances between laboratory devices according to the specifications contained in the text.

14. The laboratory system according to claim 1, wherein the control software includes a registry of accounts of a plurality of users registered with the control software, wherein the control software comprises a voice recognition function for recognising each of the registered users by their voice, wherein the control software is designed to enable the user to operate, without manual intervention, by speaking into the microphone only the laboratory device and/or the laboratory software module that said user is authorised to operate.

15. A method for controlling a laboratory device and/or a laboratory software module comprising:
   providing at least one laboratory device and at least one laboratory software module, wherein the at least one laboratory device is designed to analyse and/or synthesise a chemical substance, wherein the at least one laboratory software module is a laboratory software module for processing data obtained from the at least one laboratory device;
   providing a data processing device with control software, wherein the control software provides a user with an interface for operating the at least one laboratory device and/or the at least one laboratory software module;
   providing a portable device with microphone, wherein the portable device is interoperably connected to the control software via a network, wherein the portable device is designed, in interoperation with the control software, to enable the user to operate the at least one laboratory device and/or the at least one laboratory software module without manual intervention, by speaking into the microphone;
   identifying at least one target system based on keywords included in a voice signal picked up by the microphone, the at least one target system including the at least one laboratory device and/or the at least one laboratory software module, and the at least one target system being among a plurality of target systems;
   determining a first input format corresponding to the at least one target system, each of the plurality of target systems corresponding to a respective input format among a plurality of input formats, and the plurality of input formats including a natural language format;
   generating text including specifications based on the voice signal; and
   prompting the at least one target system to perform the analysis, synthesis and/or software function in accordance with the text including one of, converting the text into the first input format in response to determining the first input format is not the natural language format, or directly inputting the text into the at least one target system in response to determining the first input format is the natural language format.

16. The method according to claim 15, wherein the providing the portable device comprises placing the portable device within the same room as the at least one laboratory device and/or in the same room as a main control computer of a laboratory facility that includes the at least one laboratory device.

17. The laboratory system according to claim 7, wherein the control software is configured to update the assignment table by adding a new technical-language word.

18. The laboratory system according to claim 17, wherein the control software is configured to update the assignment table based on the new technical-language word being incorrectly recognized by the voice-to-text conversion system.

19. The laboratory system according to claim 1, wherein the at least one laboratory software module is a chemical substance database which is designed to interpret the text as a search input and to determine information regarding the search input in the database and to return the determined information to the control software as a result.

20. The laboratory system according to claim 19, wherein the chemical substance database stores information regarding chemical substances or chemical substance mixtures that have been produced by the at least one laboratory device.

* * * * *